Figure 1:
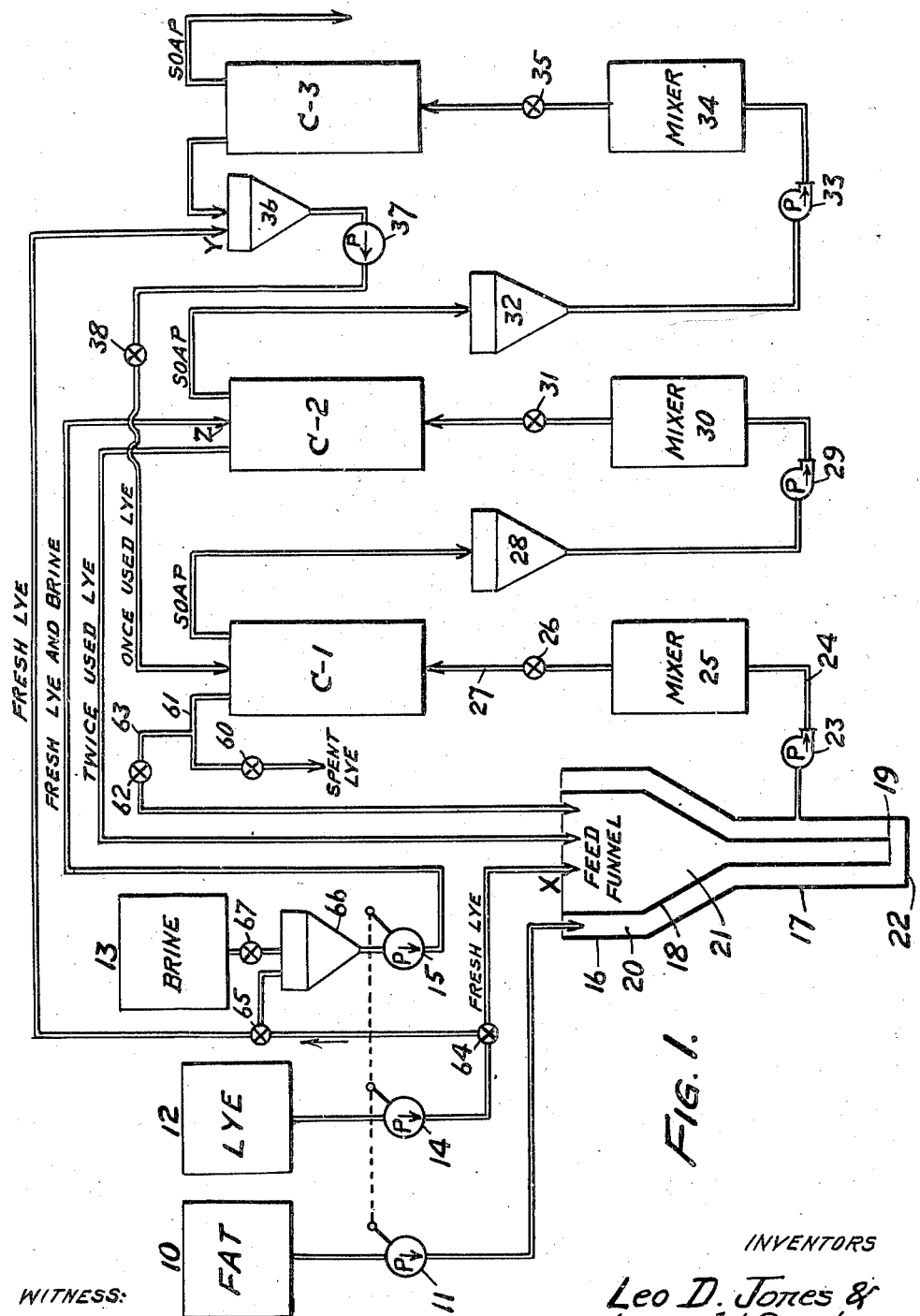

March 7, 1950 L. D. JONES ET AL 2,499,389
PROPORTIONATE FEEDING AND TREATING SYSTEM
Filed April 4, 1944 3 Sheets-Sheet 1

INVENTORS
Leo D. Jones &
Leopold Sender
BY
Maurice A. Crews
ATTORNEY.

WITNESS:
Rob R Kitchel.

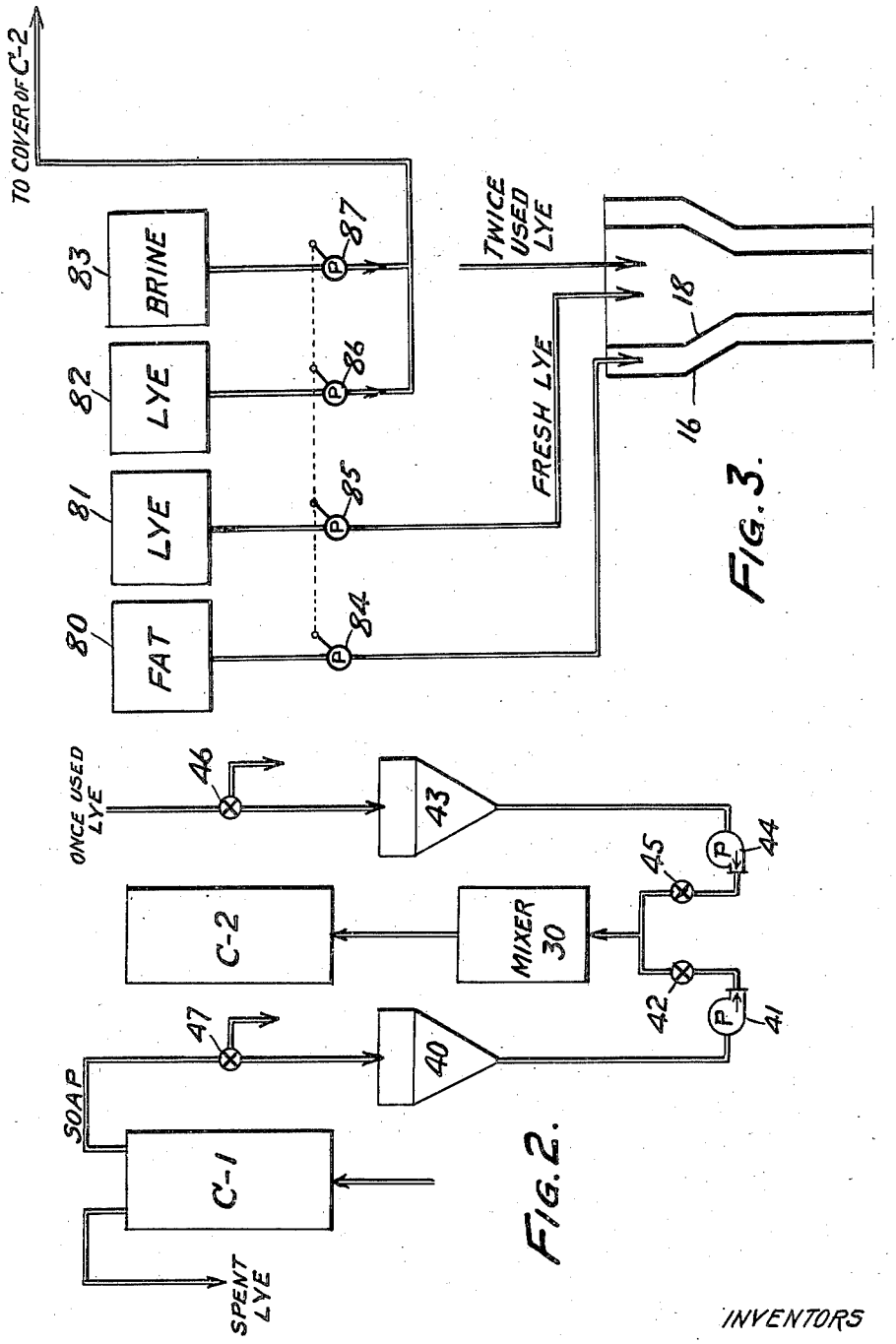

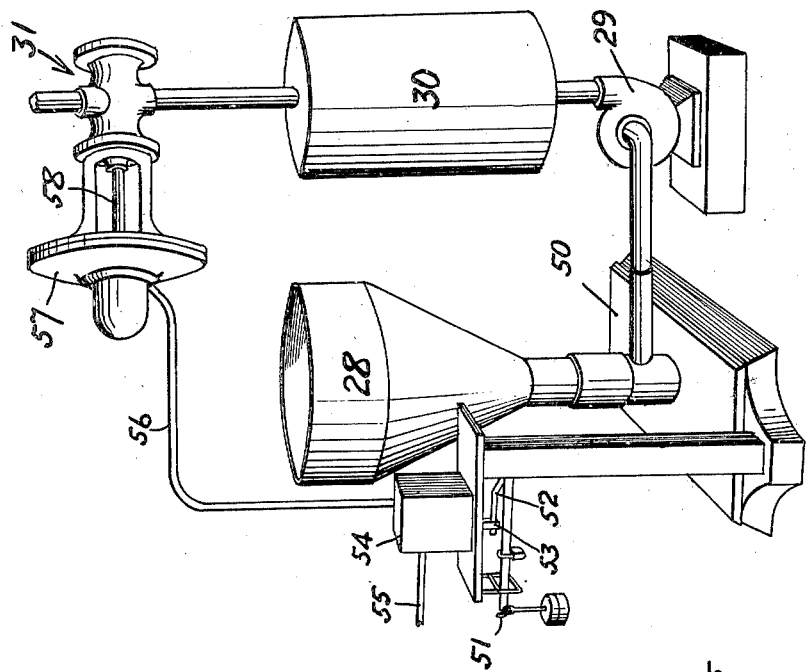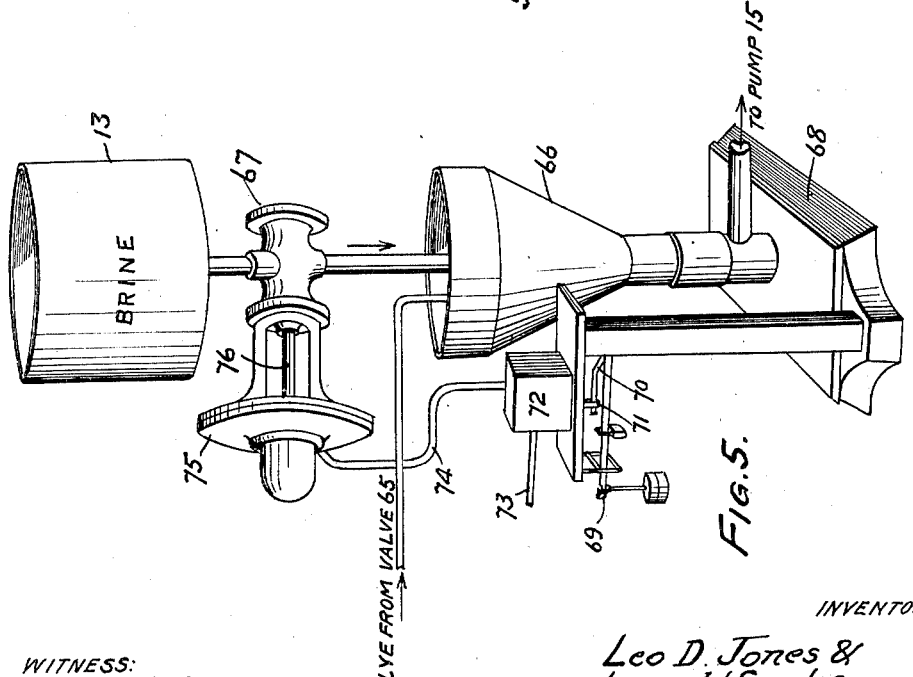

Patented Mar. 7, 1950

2,499,389

UNITED STATES PATENT OFFICE 2,499,389

PROPORTIONATE FEEDING AND TREATING SYSTEM

Leo D. Jones, Philadelphia, Pa., and Leopold Sender, Baltimore, Md., assignors to The Sharples Corporation, a corporation of Delaware Application April 4, 1944, Serial No. 529,446

2 Claims. (Cl. 260—417)

The present invention pertains to a treating and separating system and process and is concerned with problems of feeding and proportioning materials passed through such a system continuously. This application includes many features which are disclosed and claimed in the copending application of Leo D. Jones, Serial No. 495,707, filed July 22, 1943, and the present invention may be regarded as an improvement in the system and process of that prior application.

The invention of the present application was developed in connection with research involving perfection of a process and system for continuous manufacture of soap by saponification of fat in a plurality of successive counter-current treating steps, each step involving a mixing of fat or soap with the saponifying reagent followed by separation of the partially spent reagent from the soap formed in practice of the process. The present invention is directed particularly at improvements in such a system and process which enable the operator to practice the process with adequate and relatively simple control of reagent and fat flow in such a way that the ratio of reagent to fat can be accurately controlled, a part of the reagent being sent to the final saponifying stage of the process while other parts thereof may be sent to earlier stages of the process in the ratios desired, the body of reagent separated from later stages of the process being passed counter-currently for treatment of fat in earlier stages of the process, together with such fresh reagent as may be sent to such earlier stages. A particular advantage of the system and process of the invention consists in the fact that it enables the operator to adjust the ratio of reagent to fat, and to adjust the ratio of fresh reagent passed to the various stages of the process, without interrupting the course of the counter-current practice of the process.

Further features and advantages of the process will be evident from consideration of the following specification in the light of the attached drawing, in which, Figure 1 is a flow sheet illustrating practice of the process and use of the system of the invention, Figure 2 is a similar flow sheet of a portion of the apparatus, illustrating a modification which may be used in connection with the embodiments of either Figure 1 or Figure 3, Figure 3 is a similar flow sheet, illustrating only parts of the system which differ from those of Figure 1, and showing a modified form of the invention, Figure 4 is a perspective view of a portion of the apparatus designed to control intra-stage flow, and Figure 5 is a similar view illustrating control of the flow of saponifying reagent and salting out agent to the last saponifying stage of the process.

While the process and system of the invention may be used in various types of processes in which a material is treated with a liquid treating agent in a counter-current treating system involving a succession of mixing and separating steps employed in a plurality of stages, they were conceived and perfected as solutions of problems in making soap, and they will therefore be described in that connection, with the understanding that this form of description is not intended to imply a limitation of the invention to this specific field.

Referring to the embodiment of the invention illustrated in Figure 1, the fat to be saponified is pumped from container 10 by pump 11, the lye being simultaneously pumped from container 12 by pump 14, while brine, which is used as a salting out agent, passes from container 13 (in a manner which will be described hereinafter) to pump 15, by which it is pumped to the third stage of the process. The pumps 11, 14 and 15 are inter-controlled in a manner familiar in the art of proportioning to provide control of the relative proportions of fat, lye and brine fed into the treating system thereby. The fat is fed to the first treating stage of the process, and the lye is divided between the first and third treating stages of the process, or between all three of the stages of the process as illustrated, as will be explained more specifically hereinafter.

The valves 64 and 65 illustrated in the flow sheet are proportioning valves. The valve 64 may be adjusted to direct all of the lye impelled by pump 14 to the first stage of the process or it may be adjusted to direct all of this lye away from the first stage of the process. Of the lye directed away from the first stage of the process by appropriate adjustment of the valve 64, the valve 65 may direct all of this lye to the second stage of the process or it may be adjusted to direct all of this lye to the third stage of the process. The possibilities, in connection with these various adjustments, present a rather complicated picture, and it is believed that the understanding of the system and process of the present invention will be facilitated by an assumption that the valve 64 is adjusted to direct all of the lye away from the first stage of the process and the valve 65 adjusted to direct all of the lye away from the second stage of the process and to the third stage of the process, these assumptions being made until the apparatus and its method of operation under this system of adjustment have been explained. When the method of operation of the system under these conditions has been understood, the reader will then be able to understand the refinements involved in our subsequent explanation of the various possibilities of adjustment of the valves 64 and 65. For the purpose of simplicity of exposition, we will also assume that brine from container 13 joins lye from container 12, pump 14 and valves 64 and 65 in a simple T, and that the mixture of lye and brine is then pumped through the proportioning pump 15 to the third stage of the process.

Assuming the above conditions, the feed of fat to the first stage will be accomplished by passage thereof into the space 20 between an outer feed funnel 16 and an inner feed funnel 18 of a double feed funnel or reservoir 17, while saponifying reagent for this stage is fed from the separating step of the second stage of the process into the space 21 within the inner feed funnel 18. The outer feed funnel 16 is closed at its lower end as indicated at 22, and the inner feed funnel 18 terminates at 19, short of the end 22, thus providing a space for flow of saponifying reagent around the lower edge 19 and from the bottom of the inner feed funnel outwardly and upwardly into the lower part of the outer feed funnel. The arrangement for controlling the amount of materials in the inner and outer feed funnels and for similarly controlling the amounts in the other feed funnels of the invention will be described hereinafter. For our present purposes it is only necessary to explain that fat from the upper part of the space 20 between the feed funnels and lye from the lower part of this space are pumped together by centrifugal pump 23 through conduit 24 and mixer 25, where the saponifying reaction of the first stage principally occurs.

After leaving the saponifying mixer 25, the mixture passes through a valve 26 in a conduit 27 to a centrifuge C—1 (preferably of the liquid balance type). The operation of the valve 26 is controlled by the quantity of material in the double feed funnel or reservoir 17, as will be described hereinafter. The spent saponifying reagent is separated from the largely saponified soap phase in this centrifuge, and the separated saponifying reagent (spent lye) may be removed thence from the system through valve 60 of conduit 61.

In order to assist in discharge of soap of the (largely) saponified mass separated from saponifying reagent in centrifuge C—1, the saponifying reagent for the second stage of the reaction may be introduced directly into the soap-receiving cover of centrifuge C—1 to flush the discharged saponified mass from that cover. This second stage saponifying reagent may be once-used lye derived from the third stage separation, as illustrated. The mixture thus discharged from the centrifuge cover of the first stage is next passed through mixing and separating steps of the second stage to effect further reaction between saponifying reagent and saponifiable constituents, and a further separation. As illustrated, this mixture is first passed to a feed funnel or reservoir 28, and is thence pumped by pump 29 through mixer 30 and valve 31 to effect the saponification reaction of the second stage. The operation of the valve 31 is controlled to maintain a constant quantity of material in reservoir 28 in normal operation, as described hereinafter. The mixture next passes to the centrifuge C—2 of the second stage, the saponifying reagent (twice-used lye) of this centrifugation being passed into the inner feed funnel 18 to accomplish the saponification of the first stage, as described heretofore.

In a three-stage counter-current saponification process as illustrated, the fresh saponifying reagent is introduced into the third stage of the process and the fresh lye and brine from pumps 14 and 15 are accordingly introduced into the soap-receiving cover of centrifuge C—2 to assist in discharge of soap from that cover and effect the desired saponifying and graining steps in the ensuing third stage. The resulting mixture is then passed through a feed funnel or reservoir 32 to a pump 33 and is thence pumped through mixer 34 and valve 35 to centrifuge C—3, these parts corresponding in structure and function to parts 28, 29, 30, 31 and C—2 of the flow sheet. An aqueous liquid may be used to assist in discharge of soap from the soap-receiving cover of centrifuge C—3, if desired, and this saponified material may next be subjected to fitting or any other appropriate treating step.

The saponifying reagent (once-used lye) discharged from centrifuge C—3 is next pumped into confluence with saponified material discharged from the first stage, in order to effect the saponifying reaction of the second stage. As illustrated (and mentioned hereinabove), this once-used lye may be introduced directly into the soap-receiving cover of centrifuge C—1 to assist in discharging soap therefrom prior to performance of its saponifying function. In order to maintain a constant supply of saponifying reagent for feed to the second stage of the process (the soap-receiving cover of centrifuge C—1), the reagent is passed to a reservoir or funnel 36, and is pumped thence by pump 37 through valve 38 to the soap-receiving cover of centrifuge C—1. The operation of valve 38 is controlled by the quantity of material in reservoir 36 to maintain a constant quantity of that material (lye) in the reservoir and hence effect feed of the lye to the cover of centrifuge C—2 at the same rate as the rate of discharge of lye from centrifuge C—3.

During normal operation of the system as described above, a quantity of reagent will be maintained in space 21 of funnel 18 and in funnel 36, a quantity of the saponified mass from centrifuge C—1 and reagent introduced into the cover of that centrifuge will be maintained in funnel 28, a quantity of saponified mass from centrifuge C—2 and reagent introduced into the cover of that centrifuge will be maintained in funnel 32 and a quantity of unsaponified fat will be maintained in the space 20 between funnels 16 and 18. Since the weight-controlled mechanisms control operation of valves 26, 31, 35 and 38 the pumps 23, 29, 33 and 37 will not effect feed of material through mixer 25, to the cover of centrifuge C—1, or through mixers 30 and 34 until feed of further materials to these respective funnels, after these funnels contain predetermined quantities of these materials, as described hereinafter in connection with the control mechanisms for the respective funnels.

Assuming that these predetermined quantities are present in the respective funnels, as further fat is fed by pump 11 to space 20 and further lye and brine to the soap-receiving cover of centrifuge C—2 and thence to funnel 32, the valve 26 will be operated to allow the mixture from funnels 16 and 18 to flow through mixer 25 to centrifuge C—1 and the valve 35 will be operated to allow the mixture from funnel 32 to flow through mixer 34 to centrifuge C—3. The discharge of reagent from centrifuge C—3 into funnel 36 as material is passed from mixer 34 to centrifuge C—3 will actuate valve 38 to permit reagent to be pumped by pump 37 to the soap-receiving cover of centrifuge C—1, thus flushing from that cover into funnel 28 soap discharged concurrently from centrifuge C—1 which has been pumped thereto by pump 23. As this mixture is passed to funnel 28, the valve 31 will be opened, thereby permitting the pump 29 to impel mixture from mixer 30 into centrifuge C—2. The reagent (twice-used lye) from this centrifuge will be passed to space 21 to effect saponification of further fat as such fat is passed by pump 11 to space 20 and thence, together with the reagent, to the mixer 25.

From the above discussion, it will be evident that, as further fat and reagent are positively and continuously proportioned to the first and third stages, respectively, the flow of materials through the three counter-current treating stages as described above will be continuous. Since both the ratio and strength of the reagent are controlled, and since the flow from stage to stage is exactly equal to the discharge from the stages from which the materials are derived, the treatment is maintained uniform so long as the ratio and strength of reagent are maintained uniform, and the nature and proportions of the respective materials entering every stage are predetermined by the controls described above. Since predetermined quantities of materials are always maintained in the respective funnels during continuous operation, a supply will always be available for feed by the respective pumps through the steps of the process, after normal operation has once been established. Adequate control of the operation may be maintained by adjustment of the ratio of reagent to fat or of the strength of reagent from time to time, as chemical analysis or other factors may dictate.

In the above description of the apparatus and the process of the invention as illustrated in Figure 1 of the drawing, we have considered the invention in a preferred embodiment involving mixing of reagent from the third stage with saponified material discharged from the first stage before passing these materials to the reservoir 28 from which they pass through the treating steps of the second stage of the process, and we have similarly described mixing fresh saponifying reagent with the saponified mass discharged from the second stage before passing these materials to the reservoir 32 from which they pass through the treating steps of the third stage of the process. This feature of premixing materials before passing them to the respective reservoirs is useful in connection with a process in which viscous material such as the saponified mass treated in these steps is to be treated, since it assists in flow of the saponified mass from the centrifugal covers and to the reservoirs. It is also valuable because of the fact that it minimizes the amount of equipment required. It is not always vital even in connection with a soap-making process, however, and in the treatment of less viscous materials it is unnecessary.

Figure 2 of the drawing illustrates an alternative embodiment in which the saponified mass and reagent are passed through separate flow-controlling equipment into confluence with each other, and the type of equipment illustrated in this figure may be used in connection with each of the separate counter-current treating steps of the process if desired. As there illustrated, soap from the centrifuge C—1 is passed to a funnel or reservoir 40 which is controlled in the same manner as the funnels or reservoirs 28, 32 and 36 to maintain a constant quantity of saponified material therein during normal operation. The saponified mass from the funnel 40 is passed by a pump 41 through the valve 42 to mixer 30, and this valve 42 is controlled by the quantity of material in the funnel 40 in the same manner that the valve 31 of Figure 1 of the drawing is controlled by the quantity of material in the funnel 28. A funnel 43 receives saponifying reagent from the centrifuge C—3 and this saponifying reagent is pumped by pump 44 through valve 45 to mixer 30, the valve 45 being controlled by the quantity of material in the funnel 43 in the same manner as discussed above with respect to control of the various valves 26, 31, 35, 38 and 42 by the quantity of material in the funnels preceding these respective valves in the flow lines. Thus, in the embodiment of Figure 2, the proportioning of the saponified mass and saponifying reagent for flow through the mixer 30 to the centrifuge C—2 is controlled by separate funnels and valves, these materials being mixed with each other beyond the zone of flow control.

The reagent and saponified mass passing to the funnels 43 and 40, respectively, of Figure 2 of the drawing may be passed to these funnels through proportioning valves 46 and 47, respectively, and any desired proportion of either of these constituents may thus be diverted from the treating steps of the embodiment of Figure 2 by proper adjustment of these valves. Thus, in case it is desired to use less reagent in the second stage of the process than that discharged from the third stage of the process, a constant proportion of this reagent may be removed from the system or at least from the treating step of the second stage by proper adjustment of the valve 46. Similar proportioning valves may be employed in connection with the embodiment of Figure 1 of the drawing, these valves being arranged between the zones of discharge of the reagent from the respective centrifuges and respective points in the flow system of Figure 1 at which these reagents are introduced into confluence with the saponified masses for treatment in accordance with the flow sheet of that figure. By diverting from the system any fixed proportion of the reagent which is not desired for treatment in the next stage to which the reagent is passed in counter-flow, it is possible to effect uniform treatment in such subsequent stage by any desired proportion of such reagent.

As a further alternative, a double feed funnel arrangement such as that illustrated for feed of fat and saponifying reagent to the first stage of the process may be substituted for feeding and controlling arrangements of the subsequent stages.

Figure 4 of the drawing illustrates the weight-controlled mechanism by which feed of material from the funnel 28 by pump 29 through the mixer 30 and valve 31 is accomplished. The funnel 28 is supported upon the platform 50 of the scale, downward movement of this platform being opposed by weights upon the beam arm 51 of that scale. A lever 52 is connected to the beam arm for movement therewith, and this lever is, in turn, connected with a link 53 which controls the operation of an air valve in the housing 54. The operation of this valve controls flow of air from a supply source 55 through a conduit 56 to a diaphragm motor 57, this diaphragm motor serving to operate the actuating rod 58 of valve 31 in a manner substantially similar to control of valve 7 of Bristol Patent 1,405,181.

In operation, as liquid is fed to the funnel 28, during operation of the pump 29, this liquid is passed into mixer 30 until that mixer is filled, and thence to valve 31, which remains closed during this stage of the operation, due to passage of air from the source 55 through the housing 54 and conduit 56 to the diaphragm motor 57. As flow of liquid to the funnel 28 continues after the mixer 30 and feed conduits between funnel 28 and mixer 30 are filled, the level of liquid in the funnel 28 will continue to rise until the weight of that liquid causes the beam arm 51 to rise, and effect throttling or closing of the air supply valve in housing 54, through the operation of lever 52 and link 53. This will reduce or cut-off flow of air to the diaphragm motor 57, with the result that the valve 31 will be opened by spring actuation, and liquid will flow through the valve 31 to the centrifuge C—2. The level of liquid in the funnel 28 will ascend or descend at this stage of the operation, depending upon whether the rate of discharge through the valve 31 is less than or exceeds the rate of feed to the reservoir or funnel 28. The pump 29 and valve 31 have a flow capacity greater than the normal rate of feed to the funnel 28, and consequently the rate of discharge of the material through the valve 31 will exceed the rate of feed to the funnel 28 if the valve 31 is fully opened. By throttling of the valve 31 or successive opening and closing of that valve, the quantity of liquid in receptacle or funnel 28 will thus be maintained substantially constant during continued operation.

The weight-controlled mechanism is preferably designed in such manner that gradual throttling of the air valve in the housing 54 occurs as the beam arm 51 ascends, thereby partially opening valve 31 to a steadily increasing degree until the rate of discharge of liquid through that valve exactly equals the rate of feed of material to the funnel or reservoir 28. By providing sensitive equipment designed in this manner, sudden flow fluctuations are avoided with consequent improvement in efficiency of centrifugation.

The valves 35 and 38 are controlled by weight-controlled mechanism associated with the funnels 32 and 36, respectively, in exactly the same manner described above with respect to control of the valve 31.

The control of the valve 26 is accomplished by a weight-controlled mechanism identical in principle with that described above with respect to control of the valve 31. In this instance, the entire double funnel assembly 17 including the funnels 16 and 18, is mounted upon the platform of a scale, and the beam of this scale operates to effect opening of the valve 26 when the sum of the weights of the materials in the funnels 16 and 18 exceeds a predetermined amount. The weight-controlled mechanism by which this is accomplished is adjusted for a normal operation which will cause the valve 26 to be closed unless a substantial quantity of fat and lye is present in the double feed funnel assembly 17.

In starting up the system with fresh fat and lye, assuming that no fat, soap, or lye is present in any part of the system beyond the containers 10, 12 and 13, a sufficient quantity of brine is first poured into the funnel 18 to fill the mixer 25 and the system up to the level of the valve 26. Brine will then occupy the space 20 within the outer feed funnel 16, as well as the space 21 within the inner feed funnel 18. The proportioning pumps 11, 14 and 15, and the pumps 23, 29, 33 and 37 are now started, with the result that fat will be fed by the pump 11 into the space 20 between feed funnels 16 and 18, and the lye-brine solution will be fed into the cover of the centrifuge C—2. As fat is fed to the space 20, the weight of materials in the funnels 16—18 will become sufficient to cause opening of the valve 26, with the result that the brine previously in the mixer 25 and the lower portion of the funnels 16 and 18 will be displaced and discharged from the centrifuge C—1 through the spent lye outlet from that centrifuge, and fat will gradually descend through the space 20 until it reaches the level of the conduit through which this fat flows to the pump 23. In the meantime, the lye and brine solution proportioned to the flow of the fat and fed to the cover of the centrifuge C—2 will pass through funnel 32, pump 33, mixer 34, valve 35, centrifuge C—3, funnel 36, pump 37, valve 38, the cover of centrifuge C—1, funnel 28, pump 29, mixer 30, valve 31 and centrifuge C—2, to the space 21 within the inner feed funnel 18. As this lye-brine solution continues to accumulate within the space 21, it will ultimately pass around the lower edge 19 of the funnel 18 and ascend to the level of the conduit through which materials are drawn by the pump 23. After the stage of operation is reached at which lye (lye-brine solution) and fat are drawn simultaneously through conduit 24, a mixture of fat and lye in the desired proportion will be continuously impelled by the pump 23 through conduit 24 and mixer 25 to valve 26, the rate of feed of this mixture through the valve 26 being substantially the same at all times as the combined rate of feed of fat and lye to the spaces 20 and 21, respectively.

Saponification will occur in the mixer 25, and spent lye will be separated from the soap in centrifuge C—1. Soap is flushed from the cover of the centrifuge C—1 by lye injected into that cover through valve 38 from pump 37, and the mixture of soap and lye so produced will be passed to funnel 28. Flow of this mixture through that funnel will then be accomplished by the weight-control mechanism described above in connection with Figure 4 of the drawing. From the above description of the operation of the flow-controlling elements of the first two stages of the process, the operation of the second and third stages will be self-evident.

When the operator desires to shut down the operation of the system described above, he first stops the proportioning pumps 11, 14 and 15 and pump 37. Flow of material from the respective feed funnels will thus be stopped promptly due to the automatic operation of the valves 26, 31, etc., upon decrease in the weight of material in the respective feed funnels. The balancing weights associated with the feed funnels 16 and 18 are then adjusted to a position in which the valve 26 is maintained open during flow of fat and lye from the funnels 16 and 18 until no further fat remains in the space 20. During the normal operation of the system, the valve 60 in the conduit 61 through which lye is discharged from the centrifuge C—1 will be maintained open, with the result that this lye will be fed to a suitable receptacle for glycerine recovery. In operation preliminarily to shutting down the system as discussed above, however, valve 60 will be closed, and valve 62 in conduit 63 will be opened, with the result that spent lye from centrifuge C—1 will be fed into feed funnel 21, and will pass from that feed funnel through pump 23, conduit 24 and mixer 25, thereby flushing soap from this portion of the system. This recycling of lye will be continued until all of the soap in the first stage of the process has thus been flushed from the mixer 25 and passed through centrifuge C—1 into feed funnel 28. The first stage will then be cleansed of soap. By employing an operation in which the reagent solution is recycled in the manner discussed above in flushing soap from the system, saponification of the soap proceeds during flow of the soap through the mixers 25, 30 and 34, with the result that the soap discharged from centrifuge C—3 during this flushing operation is a fully saponified material.

The flushing of soap from the apparatus of the second and third stages of the process takes place simultaneously with the flushing of soap from the first stage of the process as discussed above. Thus, during the operation of the pump 23 to recycle lye-brine solution through mixer 25, centrifuge C—1 and feed funnel 21 in flushing soap from the mixer 25 and centrifuge C—1 into feed funnel 28, the pumps 29 and 33 are operated to cause flow of soap discharged into feed funnel 28 through mixer 30, centrifuge C—2, feed funnel 32, mixer 34 and centrifuge C—3 from the second and third stages of the process. At the same time, the lye-brine solution discharged from centrifuge C—2 is diverted into the cover of centrifuge C—1, instead of being passed to feed funnel 21 as in normal operation, and the lye-brine solution from centrifuge C—3 is diverted to the cover of centrifuge C—2 instead of being passed to the cover of centrifuge C—1 as in normal operation. Lye-brine solution discharged from centrifuge C—2 will thus be recycled through the cover of centrifuge C—1 in the second stage of the process until all of the soap has been flushed from that stage of the process into the feed funnel 32, and lye-brine solution from centrifuge C—3 will be recycled through the cover of centrifuge C—2 and the third stage of the process until all of the soap has been displaced from that stage of the process and from the centrifuge C—3. The weights controlling flow of material through valves 31 and 35 are adjusted during the flushing-out process to leave but a small quantity of reagent in funnels 28 and 32 at the end of the flushing-out operation. After all of the soap from all three stages has been flushed out and discharged from centrifuge C—3, the pumps and centrifuges will be shut down. When this stage of the operation has been reached, spent lye-brine solution will be present in both branches of the feed funnel 17 and in the mixer 25, twice used lye-brine solution will be present in the feed funnel 28 and mixer 30, and once used lye-brine solution will be present in the feed funnel 32 and mixer 34. The presence of these reagent solutions in the respective mixers and feed funnels is useful in connection with re-starting the system when operation is resumed, as will be evident from the following description of the operation of re-starting.

When operation of the system is to be resumed after shutting down, the pumps 11, 14, 15, 23, 29, 33 and 37, as well as the centrifuges C—1, C—2 and C—3 are started, after opening of the valve 60, closing of the valve 62, and restoration of valves controlling the flow of lye from the respective stages of the process to the portions of the system indicated by the flow diagram of Figure 1, and adjustment of the weight control elements to their normal operative positions. Fresh lye and brine fed by pumps 14 and 15 to the cover of centrifuge C—2 will be discharged into weight control member 32 and accumulate in that member until a sufficient weight is present to cause opening of valve 35, whereupon the material in the funnel 32 and mixer 34 will be passed through centrifuge C—3 to weight control member 36. Upon flow of reagent solution to weight control member 36 the valve 38 will be opened and the lye from that weight control member will be injected into the cover of centrifuge C—1. This lye injected into centrifuge C—1 will flow into weight control member 28 and thence in similar manner through mixer 30 and centrifuge C—2, from which it will flow into the space 21 within inner feed funnel 18. At the same time, fat will flow from container 10 into the space 20 within outer feed funnel 16 and gradually displace spent lye-brine solution upwardly from that feed funnel into the space 21 within inner feed funnel 18. As the twice used lye from centrifuge C—2 accumulates in the space 21 within feed funnel 18, the weight of material in the double feed funnel member 17 will ultimately become sufficient to cause the valve 26 to be opened and liquid to flow through that valve to centrifuge C—1. This liquid, which is the spent reagent solution, will flow through valve 60 and be discharged thence from the system. After discharge of this spent reagent, fat from space 20 within outer feed funnel 16 and lye from space 21 within inner feed funnel 18 will be passed together through pump 23, mixer 25 and centrifuge C—1, with the result that the spent lye resulting from treatment of the fat in mixer 25 will be discharged through valve 60 from the system, while the soap will be discharged into feed funnel 28. When this stage of the process has been reached, and flow of reagent into the various centrifuge covers has been established as described above, the saponification steps will be accomplished by counter-current operation, as described above in connection with initial starting up of the system.

By employing the above-described sequence of steps in flushing soap from the system upon shutting down and upon starting the system in operation again, the fat and partially saponified products treated in the various stages of the process are subjected to treatment, upon starting up again, with reagents of the same strength as are used in the various stages of the system during normal continuous counter-current operation.

When the valves 64 and 65 are adjusted to the positions described above, and the system operated in the manner we have discussed, the functioning is substantially identical with that provided by the system and process of the prior application of Leo D. Jones, Serial No. 495,707, filed July 22, 1943. A particular feature and object of the present invention consists in the association of valves 64, 65 and 67 with the weight controlled funnel or reservoir 66 as described hereinafter, and in adjustment of the valves to provide for passage of the major portion of the fresh lye to the cover of the centrifuge C—2 as discussed above, while a substantial proportion of the fresh lye is also passed to feed funnel 21 and feed funnel 36, respectively, or to one or the other of these members.

By adjustment of the valves 64 and 65 to cause passage of a selected proportion of the fresh lye to the first and/or second stages of the process, in addition to passage of a major proportion of the lye to the third stage of the process, great advantages are attained in the soap-making operation. The system is designed to enable the operator to effect adjustment of these relative proportions during the course of continuous operation, and appropriate adjustment enables the operator to obtain a soap of lower moisture content and lower free alkali content than could otherwise be attained, and at the same time to effect more economical utilization of the lye and more complete saponification of the fat than would be possible if the system were rigidly designed to pass all of the fresh lye to the last saponification stage at all times. An important advantage attained by the provision of a system and process by which a part of the fresh lye can be diverted to the earlier stages of the process selectively consists in the fact that, by effecting this type of control, the Na₂O content of the soap from the last stage of the process can be accurately controlled. The refinements of the system to be described hereinafter enable the operator, upon ascertainment of the alkalinity of the soap from the respective stages, to make exactly the required adjustment to correct the situation, and to do this without any interruption of the practice of the continuous process.

Figure 5 of the drawing illustrates the weight-controlled mechanism by which feed of brine from container 13 through valve 67 to funnel 66 is controlled. The funnel 66 is supported upon the platform 68 of a scale, downward movement of this platform being opposed by weights upon the beam arm 69 of that scale. A lever 70 is connected to the beam arm for movement therewith, and this lever is, in turn, connected with a link 71 which controls the operation of an air valve in the housing 72. The operation of this valve controls flow of air from a supply source 73 through a conduit 74 to a diaphragm motor 75, this diaphragm motor serving to operate the actuating rod 76 of valve 67 in a manner substantially similar to control of valve 7 of Bristol Patent 1,405,181.

The operation of the apparatus described above is similar in principle to control of the valve 31 of Figure 4 of the drawing by the weight of material in the funnel 28, except that the pneumatic connections to the valve 67 have a reverse relationship to the scale as compared to those of Figure 4, since the valve 67 must be closed in response to the presence of a predetermined weight of liquid in the funnel 66, whereas the valve 31 must be opened in response to the presence of a predetermined weight of liquid in the funnel 28. When the weights of the scale are properly adjusted, the valve 67 will be maintained open at all times unless a predetermined weight of material is in the funnel 66. When this predetermined weight is present in the funnel, however, the valve 67 will be closed, thereby precluding further flow of brine into the funnel 66 until further liquid is pumped from that funnel by pump 15.

In operation of the valves 65 and 67 and the feed funnel 66 and scale 68, assuming that at least a part of the lye from pump 14 is being passed by valve 64 to valve 65, and that at least a part of the lye which reaches valve 65 is being passed by that valve into the conduit 77 through which it is directed into the feed funnel 66, this lye will be pumped by pump 15 from the feed funnel 66 at a rate which is proportioned in the desired degree to the rate of pumping of fat and lye by pumps 11 and 14. In the normal operation of the system, the pump 15 will be set to effect pumping of liquid from funnel 66 at a rate greater than the rate of passage of liquid to the funnel 66 by the valves 64 and 65. Assuming that, in starting the operation of the pump 15, there is a quantity of liquid (e. g., a lye and brine mixture) sufficient to cause closing of the valve 67 by the weight-controlled mechanism, and assuming that liquid is pumped from the funnel 66 by pump 15 at a rate greater than the lye is pumped through conduit 77 to funnel 66, the diminution in weight of liquid in the funnel 66 by removal of liquid therefrom by pump 15 will result in opening of valve 67 to make up for the deficiency of liquid supplied through conduit 77. It will be seen that, by this system and method of operation, the total ratio of lye to fat introduced into the system is determined by the relative settings of pumps 11 and 14, while the proportions of fresh lye passed to the respective stages are determined by the settings of the valves 64 and 65. Brine will also be passed to the third saponification stage, in a substantially continuous manner, through the valve 67, since this valve will be maintained open most of the time in order to enable sufficient brine to be passed to the funnel 66 to make up for the deficiency of lye passed through conduit 77 to that funnel, as compared to the rate of passage of liquid to the third saponification stage through the pump 15.

As has been noted above, normal operation of the system of Figure 1 of the drawing will involve passage of fresh lye to the first and second stages of the saponification process, as well as to the third stage, and the purpose of the refinements of the present application, as compared to the prior application of Leo D. Jones, Serial No. 495,707, filed July 22, 1943, has been to facilitate control of passage of fresh lye to at least one of these two earlier stages. The operation of the system in starting up, stopping and restarting has been described above in connection with use of the system in a hypothetical case in which all of the lye and brine were passed to the centrifuge C—2. These operations of starting up, stopping and restarting may be practiced exactly as there described, even in cases in which it is desired to pass a part of the fresh lye to the first and/or second stages. The only difference, in connection with this type of operation will be that, once the system has been well started as described above, the valve 64 and/or the valve 65 will be adjusted to permit passage of a part of the fresh lye to the first and/or second stage of the process. It will be evident from consideration of the discussion of Figure 5, above, that diminution of the rate of flow of lye through conduit 77 to funnel 66 without change of the setting of the flow rate of the pump 15 will result in passage of an increased ratio of brine to lye from container 13 into funnel 66, thereby increasing the ratio of brine to lye passed to the third stage of the process. It will thus be seen that, regardless of the settings of the valves 64 and 65, the total quantity of treating liquid passed to the third stage of the process will be determined by the pump 15, the only effect of a change in the setting of the valves 64 and 65 in this regard being to alter the ratio of brine to lye passed to this stage of the process. This is a desirable feature, since it is important that an adequate supply of liquid be passed to the third stage of the process for washing and graining purposes.

Figure 3 of the drawing illustrates a modification of the invention by which the process may be practiced to obtain exactly similar results to those discussed above in connection with the principal embodiment, but in which the ratio of lye to fat, lye to brine, and lye passed to the third stage to lye passed to other stages, is controlled by separate proportioning pumps or meters, instead of control of flow of lye by the valve and weight control arrangement of Figure 1 of the drawings. As illustrated in Figure 3 of the drawing, fat from container 80 is passed by pump 84 to the outer feed funnel 16 of the first stage of the process, while fresh lye is passed from container 81 by pump 85 to inner feed funnel 18 of this stage, while lye from container 82 is passed by pump 86 into confluence with brine passed from container 83 by pump 87, this mixture being thereafter passed to the cover of centrifuge C—2, and thence to the third stage of the process, as illustrated. A separate lye proportioning pump may be provided to pass lye to the second stage of the process if desired, or this may be accomplished by employment of a proportioning valve by which a part of the lye from pump 85 is passed to the first stage of the process and a part to the second stage.

By suitable adjustment of the proportioning pumps or meters 84, 85, 86 and 87, it is possible to effect any desired control of the lye, brine and fat ratios exactly as in connection with the embodiment of Figure 1 of the drawing. Except for the differences noted above, the system and process involved in the embodiment of Figure 3 of the drawing are identical with corresponding features of the embodiment of Figure 1 of the drawing.

Modifications will be obvious to those skilled in the art, and we do not therefore wish to be limited except by the scope of the following claims.

We claim:

1. The combination with a multi-stage system for the treatment of a phase containing saponifiable fat with a reagent phase containing lye and brine for the production of soap and which system comprises a plurality of separate stage means for mixing and then separating streams of said phases, means for feeding the respective phases to opposite ends of said system in separate streams, and means for causing the respective streams of said phases to progress from stage to stage in opposite directions, of means for feeding fresh lye into confluence with said reagent phase downstream from its initial point of entry into said system, means for maintaining substantially constant the proportion of total lye to fat fed into said system, means for combining lye and brine to form initial reagent phase, and means including means for varying the proportion of lye to brine combined to form said initial reagent phase for maintaining substantially constant the volume flow into said system of initial reagent phase.

2. In a process for the treatment in a multi-stage system of a phase containing saponifiable fat with a reagent phase containing lye and brine for the production of soap, which system comprises a plurality of separate stages for intimately mixing and then separating streams of said phases, and in which system the respective phases are fed to opposite ends of said system in separate streams and progress in separate streams from stage to stage in opposite directions, the steps of feeding fresh lye into confluence with said reagent phase after the initial lye of said reagent phase becomes partially spent while maintaining the feed rate ratio into said system of total lye to fat substantially constant, and of controlling the ratio of brine to lye initially combined to form said reagent phase in a manner so that the volume rate of entry of said reagent phase into said system at the reagent phase feed end thereof is maintained substantially constant.

LEO D. JONES.
LEOPOLD SENDER.

REFERENCES CITED

The following references are of record in the file of this patent:

UNITED STATES PATENTS

| Number | Name | Date |
|---|---|---|
| 1,666,560 | Edeleneau | Apr. 17, 1928 |
| 2,023,545 | Pummill | Dec. 10, 1935 |
| 2,132,151 | Fenske | Oct. 4, 1938 |
| 2,300,749 | Scott | Nov. 3, 1942 |
| 2,300,750 | Scott | Nov. 3, 1942 |
| 2,300,751 | Scott | Nov. 3, 1942 |
| 2,335,457 | Sender | Nov. 30, 1943 |